United States Patent
Herrmann et al.

(10) Patent No.: US 8,154,631 B2
(45) Date of Patent: Apr. 10, 2012

(54) COMPENSATION OF LEAKAGE CURRENT AND RESIDUAL SIGNALS FOR INTEGRATING DETECTOR BASED ON DIRECT X-RAY CONVERSION

(75) Inventors: Christoph Herrmann, Aachen (DE);
Walter Ruetten, Linnich (DE);
Matthias Simon, Aachen (DE); Bernd Menser, Neu-Moresnet (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 414 days.

(21) Appl. No.: 12/441,593

(22) PCT Filed: Sep. 17, 2007

(86) PCT No.: PCT/IB2007/053747
§ 371 (c)(1),
(2), (4) Date: Mar. 17, 2009

(87) PCT Pub. No.: WO2008/038177
PCT Pub. Date: Apr. 3, 2008

(65) Prior Publication Data
US 2009/0290050 A1    Nov. 26, 2009

(30) Foreign Application Priority Data
Sep. 25, 2006   (EP) .................................... 06121191

(51) Int. Cl.
*H04N 9/64* (2006.01)
(52) U.S. Cl. ..................................................... 348/243
(58) Field of Classification Search .................... 348/243
See application file for complete search history.

(56) References Cited

U.S. PATENT DOCUMENTS

| | | |
|---|---|---|
| 2001/0013571 A1 | 8/2001 | Kakumoto et al. |
| 2003/0146389 A1 | 8/2003 | Busse et al. |
| 2005/0231656 A1 | 10/2005 | Den Boer et al. |

FOREIGN PATENT DOCUMENTS

EP    0792065 A2   8/1997
(Continued)

OTHER PUBLICATIONS

Kraft et al: "Counting and Integrating Readout for Direct Conversion X-Ray Imaging Concept, Realization and First Prototype Measurements": Nuclear Science Symposium Conference Record, 2005 IEEE Wyndham El Conquistador Resort, Puerto Rico, Oct. 23-29, 2005, pp. 2761-2765.*

(Continued)

*Primary Examiner* — Joseph P Martinez (57) ABSTRACT

The application describes an X-ray detector, which uses direct X-ray conversion (DiCo) combined with CMOS pixel circuits. DiCo materials have to be used with high voltage to achieve a high field strength. This makes the sensor prone to leakage currents, which falsify the measured charge result. Moreover, most direct conversion materials suffer from large residual signals that lead to temporal artifacts (ghost images) in an X-ray image sequence. A circuit is described, which senses the sensor's dark current including residual signals from previous exposures before the sensor is exposed (again) to X-ray, and freezes relevant circuit parameters at the end of the sensing phase in such way, that the dark current (leakage current and residual signal) can still be drained during exposure. Therefore, the charge pulses generated in the sensor due to X-ray exposure can be integrated without charges carried by the leakage current or residual signal, thus obtaining a more accurate estimate of the deposited X-ray energy.

11 Claims, 5 Drawing Sheets

FOREIGN PATENT DOCUMENTS

| | | | |
|---|---|---|---|
| EP | 1693893 | * | 8/2006 |
| EP | 1693893 A2 | | 8/2006 |
| WO | 2004110056 A1 | | 12/2004 |

OTHER PUBLICATIONS

Mori et al: "High Resolution and Shigh Sensitvity CMOS Panel Sensors for X-Ray"; 2002 IEEE, Nuclear Science Symposium Conference Record, vol. 1, pp. 29-33.

Andre et al: "An Integrated CMOS-Selenium X-Ray Detector for Digital Mammography"; Part of the SPIE Conference on Physics of Medical Imaging, SPIE vol. 3336, 1998, pp. 204-209.

Zhao et al: "Investigation of Lag and Ghosting in Amorphous Selenium Flat-Panel X-Ray Detectors"; SPIE Medical Imaging, Proceedings of SPIE vol. 4682, 2002, pp. 9-20.

* cited by examiner

Compensation of steady state dark current (leakage current) in continuous exposure mode Sensing phase Compensation of 'dynamic' dark current (leakage current + residual signals) in pulsed exposure mode Sensing phase   Sensing phase   Sensing phase

FIG. 5

COMPENSATION OF LEAKAGE CURRENT AND RESIDUAL SIGNALS FOR INTEGRATING DETECTOR BASED ON DIRECT X-RAY CONVERSION

The present invention relates to a method and a device including a circuit, which allows for eliminating a dark current, and in particular to a method and a device including a circuit for eliminating a sensor material's dark current such (i.e. leakage current and residual signals of the previous exposure) such that it is not integrated within an integrating circuit.

Currently most solid-state digital X-ray detectors in the market are built of a flat glass plate with amorphous silicon (a-Si) thin film electronics and an X-ray conversion layer on top of it. They are either of the indirect conversion type with a scintillator on top of an array of photodiodes or of the direct conversion type using a photoconductor on top of an array of electrodes. The impinging X-rays are absorbed in the conversion layer and, via the generated charges in each pixel of the array, create a digital image of the X-ray absorption.

An alternative to thin film electronics on glass is the use of wafers of monocrystalline silicon for the pixel electronics. As above, pixels with or without photodiodes can be built for either indirect or direct X-ray conversion. The use of standard CMOS processes in monocrystalline silicon leads in general to electronic circuits with less noise and more functionality compared to a-Si pixel circuits. In case of an indirect conversion detector, the scintillator can either be glued or grown directly on the Si wafer. For direct X-ray conversion materials there are also two possibilities: either connecting a separately fabricated layer, e.g. with bumb balls or a direct deposition on silicon. An example of a CMOS detector of the indirect conversion type can be found in H. Mori, R. Kyuushima, K. Fujita, M. Honda, "High Resolution and High Sensitivity CMOS PANEL SENSORS for X-ray", IEEE 2001 Nuclear Science Symposium Conference Record, Vol. 1, pp. 29-33 (2001).

Today the pixel pitch in flat X-ray detectors reaches from 150-200 µm except for mammography and dental imaging, where pixel sizes of less than 100 µm are common. A general trend can be observed in X-ray imaging, that the spatial resolution also for cardiology, neurology and vascular applications is going to be increased. The pixel size of mono-crystalline Si detectors can easily be reduced to values far below 100 µm because of the small sizes, which are possible with this technology for transistors and other electronic elements.

However, in the case of an indirect conversion detector, the spatial resolution will be limited by the light spread in the scintillator. In general its thickness cannot be reduced since otherwise it is impossible to maintain a high X-ray absorption yield. To fully exploit the high spatial resolution of a detector with small pixels, direct X-ray conversion is suited better. Direct conversion materials like selenium, mercury iodide, lead oxide or CdTe can be easily made thick enough to absorb more than 80% of the X-rays with a beam quality typical for medical imaging. A very high spatial resolution is usually achieved because the generated charge carriers (electrons and holes) follow the field lines of the applied bias field, which run perpendicular to the surface of the pixel electrode and the usually unstructured top electrode. One example of a direct conversion type CMOS detector was published in M. P. Andre et al., SPIE Medical Imaging Vol. 3336, pp. 204 (1998).

Besides the spatial resolution another advantage of a direct conversion CMOS detector is the possibility to overcome the limited fill factor of a photodiode in a small pixel. In a direct conversion detector a metal layer covering nearly the whole pixel area can serve as pixel electrode. It is the size of this pixel electrode, which determines the fill factor in case of the direct conversion detector.

Across the X-ray conversion layer, usually a wide band-gap semiconductor material, a high voltage is applied to ensure an efficient transport of charge carriers. This leads to a finite current through the layer even without X-ray excitation dependent on the material resistivity and the barrier heights of any metal-semiconductor interfaces. This leakage current produces noise and lowers the dynamic range of the detector.

A common property of almost all direct conversion materials is their slow temporal behaviour, see e.g. W. Zhao, G. DeCrescenzo, J. A. Rowlands, "Investigation of lag and ghosting in amorphous selenium flat-panel x-ray detectors", SPIE Mediacal Imaging Vol. 4682, pp. 9-20, 2002. Trapping and detrapping of X-ray generated charge carriers lead to the problem or disadvantage of residual signals from previous exposures in subsequent frames. The strength of these residual signals, often called lag, depends on the used direct conversion material, and is generally about a few percent of the exposure signal level after one second. This results in visual temporal artefacts ('ghost images') that limit the use of direct conversion x-ray detectors for dynamic applications. If the detector is used in a pulsed exposure mode, the residual signals manifest themselves as an increased dark current between subsequent X-ray windows. In the following, the term 'dark current' is used to describe the sum of steady state leakage current and dynamic residual signals from previous exposures.

US 2003/0146389 A1 describes a sensor and a method for operating the sensor which includes a plurality of sensor elements, each of which includes a radiation-sensitive conversion element, and also with means for amplifying the electric signal in each sensor element and a read-out switching element in each sensor element which is connected to a read-out line in order to read-out the electric signal. The means for amplifying include a respective source follower transistor, whose gate is connected to the conversion element, whose source is connected on the one side to an active load and on the other side to one side of a sampling capacitor, the other side of the sampling capacitor being connected to the read-out line via the read-out switching element, a respective reset element being connected to the conversion element.

US 2005/0231656 A1 describes an image sensor array including image sensors having photo TFTs to generate photocurrent in response to received images. The photo TFTs each have their respective gate electrodes and source electrodes independently biased to reduce the effects of dark current. Storage capacitors are coupled to each photo TFT and discharged upon generation of a photocurrent. Each storage capacitor is coupled to a read out TFT that passes a current from the storage capacitor to a data line.

WO 2004/110056 describes a detector and a method for the production on consecutive X-ray images involving the generation in the detector by X-radiation during an exposure interval of a current flow which is integrated in a memory capacity and read out in a subsequent read out phase. In order to minimize the influence of slowly decaying residual currents, the current is integrated only during the exposure interval.

It would be desirable to provide a method and a device allowing an improved dark current compensation of a sensor.

The invention provides a method for eliminating in an examination exposure device a sensor's dark current, a dark current compensation device, a corresponding exposure device and examination apparatus, and a computer-readable medium, a program element and a computer chip for carrying out the method.

It should be noted that the following described exemplary embodiments of the invention apply also for the method, the dark current compensation device, the corresponding exposure device and examination apparatus, the computer-readable medium, the program element, and the computer chip.

According to an exemplary embodiment of the present invention a method for eliminating a sensor's dark current in an examination exposure device, the dark current resulting from a steady state leakage current and/or dynamic residual signals of the sensor from previous exposures, includes the steps of in a first phase applying a predetermined voltage to the sensor and sensing the dark current being input into a dark current compensation device, and in a second phase freezing a state within the dark current compensation device which it had when draining the dark current in the first phase while applying the predetermined voltage at the sensor.

Thus, the amount of a dark current resulting from steady state leakage currents and dynamic residual signals of the sensor from previous exposures, respectively, can be determined in advance so that once determined, this amount can be compensated by draining the dark current. Draining the dark current in a compensation device during examination exposure avoids that the dark current is sampled and detected in a detecting device, e.g. an integrator.

Hence, also during X-ray exposure of a sensor pixel, the dark current is still drained so that it is no longer available for detection, in particular for integration, and does not falsify the detection result.

As a consequence, a better estimate of the charges, which are generated by X-ray photons within the sensor material, is obtained. Dark current compensation also enables the use of higher bias voltages across the layer leading to higher conversion efficiencies.

According to a further exemplary embodiment of the present invention the step of the first phase may be applied keeping the sensor substantially free of X-ray exposure.

The influence of the X-ray exposure may be used for examination, and the dark current is generated by the sensor's state and history, i.e. the influences of previous exposures due to a kind of memory effect.

According to a further exemplary embodiment of the present invention, the step of the first phase is applied within an examination-exposure-free intermediate dark frame or within a reset phase. During the reset phase, the predetermined voltage may be maintained at the sensor.

Thus, the determination of a dark current can be carried out when no examination takes place, e.g. between two exposures in an examination-exposure-free intermediate dark frame. During examination the dark current shall be compensated, so that influences thereof can be avoided.

According to a further exemplary embodiment of the present invention the first phase includes a step of charging a capacitance, the voltage thereof determining a gate-source voltage of a FET, which also drains the dark current.

According to a further exemplary embodiment of the present invention the step of the second phase includes keeping a gate-source voltage of a FET at a level, which it had when the FET drained the dark current the in a first phase.

According to a further exemplary embodiment of the present invention the step of the second phase includes a step of freezing the voltage across a capacitance keeping a gate-source voltage of a FET at a level it had, when the FET drained the dark current during the first phase.

A capacitance, e.g. that of a capacitor, is a simple and efficient device, when having a low parasitic resistance, to keep a constant voltage state, in particular across a high resistive input of a FET.

According to a further exemplary embodiment of the present invention the method further comprises a step of charging an integration capacity with a second voltage, wherein one terminal of the integration capacity is connected to the input of the dark current compensation circuit and the input of an amplifier, the other terminal of which is connected to ground. The amplifier may be a voltage follower or source follower.

According to a further exemplary embodiment of the present invention the method further comprises a step of measuring the dark-current-compensated output signal of the sensor by means of the integrator.

Thus, the measuring device in form of an integrator is prepared for the measuring procedure.

According to an exemplary embodiment of the present invention a dark current compensation device serves for compensating a dark current resulting from a steady state leakage current and/or dynamic residual signals of a sensor, wherein the device includes a first FET, the drain of which is connected to the input of the device and connected to ground via a first current source, the gate of which is connected to the input of the device via a first switch, and the source of which is connected to a voltage supply terminal via a second current source, a second FET, the drain of which is connected to ground, the gate of which is connectable to a reference voltage, and the source of which is connected to the source of the first FET, and a capacitance, one terminal of which is connected to the gate of the first FET and the other terminal of which is connected to the voltage supply terminal.

With such a device it may be possible to detect in advance the dark current appearing from a steady state leakage current and/or dynamic residual signals of a sensor, respectively, and to compensate the dark current by freezing the state of the circuit, which it had when no examination exposure is detected by the sensor, by maintaining the voltage of the capacitance on the level it had before.

Thus, also during X-ray exposure of a pixel of the sensor, the dark current is still drained via the device so that it is no longer available for integration.

Consequently, a better estimate of the charges, which are generated by X-ray photons within the sensor material, is obtained. Dark current compensation also enables the use of higher bias voltages across the layer leading to higher conversion efficiencies.

According to a exemplary embodiment the FET is a MOSFET.

According to a further exemplary embodiment of the present invention the first current source provides half of the current of the second current source.

According to a further exemplary embodiment of the present invention the first and second FET are substantially equal in dimensions.

When the first and second FET are equal in dimensions the current in the branch of each FET is the same. The current of the current source between the FETs and the voltage supply is twice the current of each of the branches of the FETs.

According to a further exemplary embodiment of the present invention there is provided an exposure device e.g. an x-ray detector for being used in an examination apparatus e.g. a medical x-ray imaging system, wherein the exposure device includes a voltage supply, a dark current compensation device of any one of the above embodiments, a sensor device, one terminal of which is connected to the output of the voltage supply, and a further terminal of which is connected to the input of the dark current compensation device, and an integration device, the input of which is connected to the input of the dark current compensation device via a third switch.

According to a further exemplary embodiment of the present invention the sensor device comprises a direct conversion material layer, having on one side a metal electrode for applying a predetermined voltage, and on the other side a pixellated electrode. In particular for each pixel of the sensor device, there is provided an integration device and a dark current compensation device. The integration device and the dark current compensation device form a pixel electronics, which is provided for each pixel. A plurality of pixels including the pixel electronics can be connected to each other. In other words, a plurality of pixels can be binned.

According to a further exemplary embodiment of the present invention the sensor device is capable of sensing electro magnetic radiation, in particular X-ray radiation.

According to a further exemplary embodiment of the present invention the voltage supply includes a voltage source of a predetermined voltage, one terminal of which is connected to ground and the other terminal of which is connected to the output of the voltage supply via a resistor, and a capacitance, one terminal of which is connected to ground and the other terminal of which is connected to the output of the voltage supply.

The resistance and the capacitance serve for avoiding ripples in the voltage source and for setting the current supplied to the sensor.

According to a further exemplary embodiment of the present invention the integration device includes an amplifier, the input of which is connected to the input of the integration device and the output of which is connectable to a sample and hold stage, an integration capacitance, one terminal of which is connected to the input of the amplifier and the other terminal of which is connected to ground, and a second voltage source, one terminal of which is connected to ground and the other terminal thereof is connected to the input of the integration device via a third switch.

According to a further exemplary embodiment of the present invention an examination apparatus comprises an exposure device of any one of the above embodiments.

According to a further exemplary embodiment of the present invention in a computer-readable medium a computer program is stored, which, when being executed by a processor is adapted to carry out the steps of the method of any of the above embodiments.

According to a further exemplary embodiment of the present invention a program element, which, when being executed by a processor, is adapted to carry out the steps of the method of any of the above embodiments.

According to a further exemplary embodiment of the present invention a computer chip is adapted to carry out the steps of the method of any of the above embodiments.

It may be seen as the gist of the present invention to determine a dark current in a first state of a circuit and first phase of a method, respectively, for setting the circuit to maintain the determined state, such that the previously determined dark current becomes eliminated and thus does not impact the integration when measuring the signal of the examining exposure.

These and other aspects of the present invention will become apparent from and elucidated with reference to the embodiments described hereinafter.

Exemplary embodiments of the present invention will be described in the following with reference to the following drawings.

Figure 1:
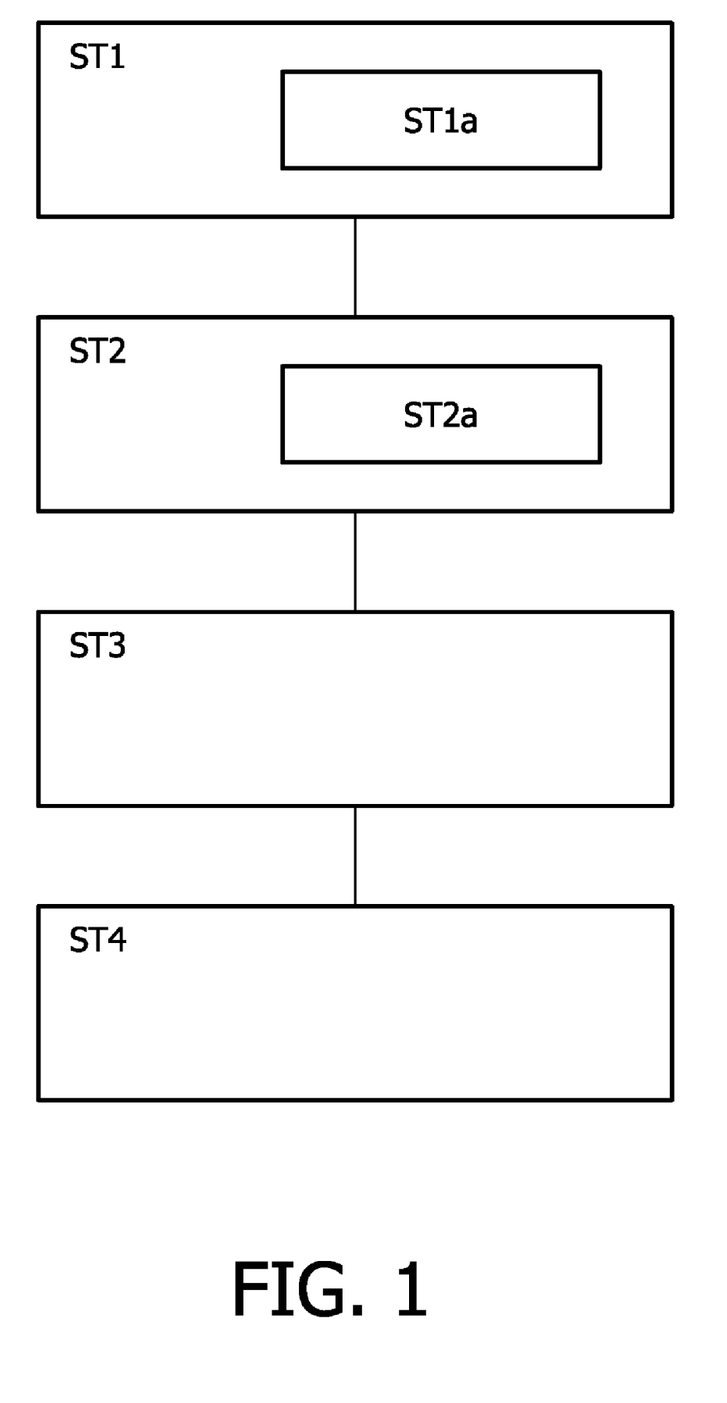
FIG. 1 shows a flowchart diagram illustrating the steps of a method of an exemplary embodiment of the present invention.

FIG. 1 shows a flow chart illustrating the steps of the inventive method. It should be noted that not all illustrated steps are obligatory for the present invention.

The method for eliminating a sensor's dark current in an examination exposure device, the dark current resulting from a steady state leakage current and/or dynamic residual signals of the sensor from previous exposures, includes the step ST1 of applying a predetermined voltage HV to the sensor and sensing the dark current $I_L$ being input into a dark current compensation device in a first phase. The step ST1 may include a step ST1a of charging a capacitance $C_A$, the voltage thereof determining a gate-source voltage of a FET, which controls draining the dark current. In a further step ST2 a state within the dark current compensation device which it had when draining the dark current is frozen is a second phase. The step ST2 may include a step ST2a of keeping a gate-source voltage of a FET at a level, which it had when the FET drained the dark current the in a first phase. In step ST2, the predetermined voltage HV may be maintained at the sensor. In a further step ST3 an integration capacity $C_{int}$ is charged with a second voltage $V_2$, one terminal of the integration capacity is connected to the input of the dark current compensation circuit and the input of an amplifier "=1", the other terminal of which is connected to ground. A further step ST4 includes measuring the dark-current-compensated output signal of the sensor by means of the amplifier. Also, the predetermined voltage HV may be maintained at the sensor during all of the above steps.

Figure 3:
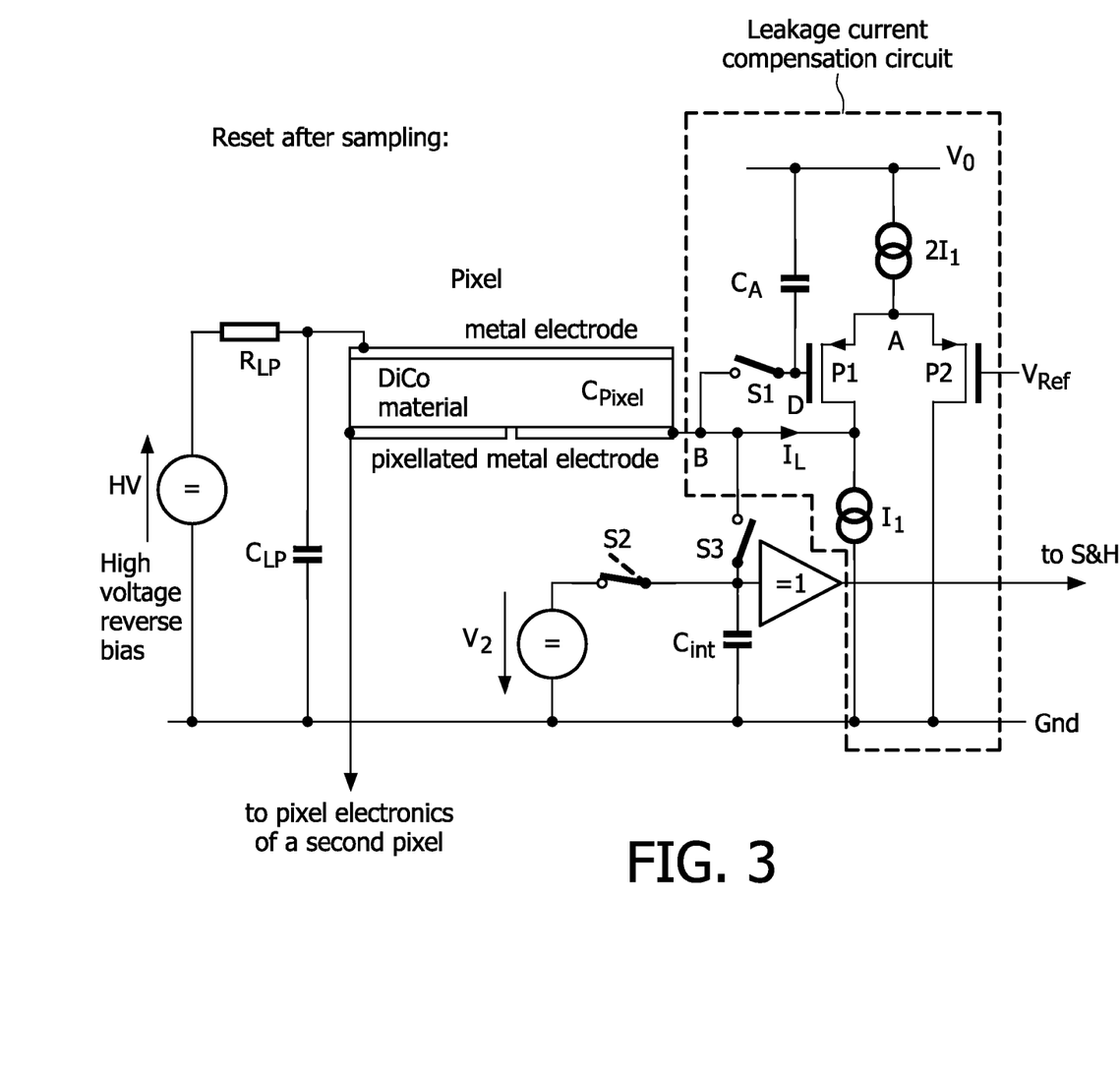
FIG. 3 shows reset after sampling of a circuit of an exemplary embodiment of the present invention.
Figure 4:
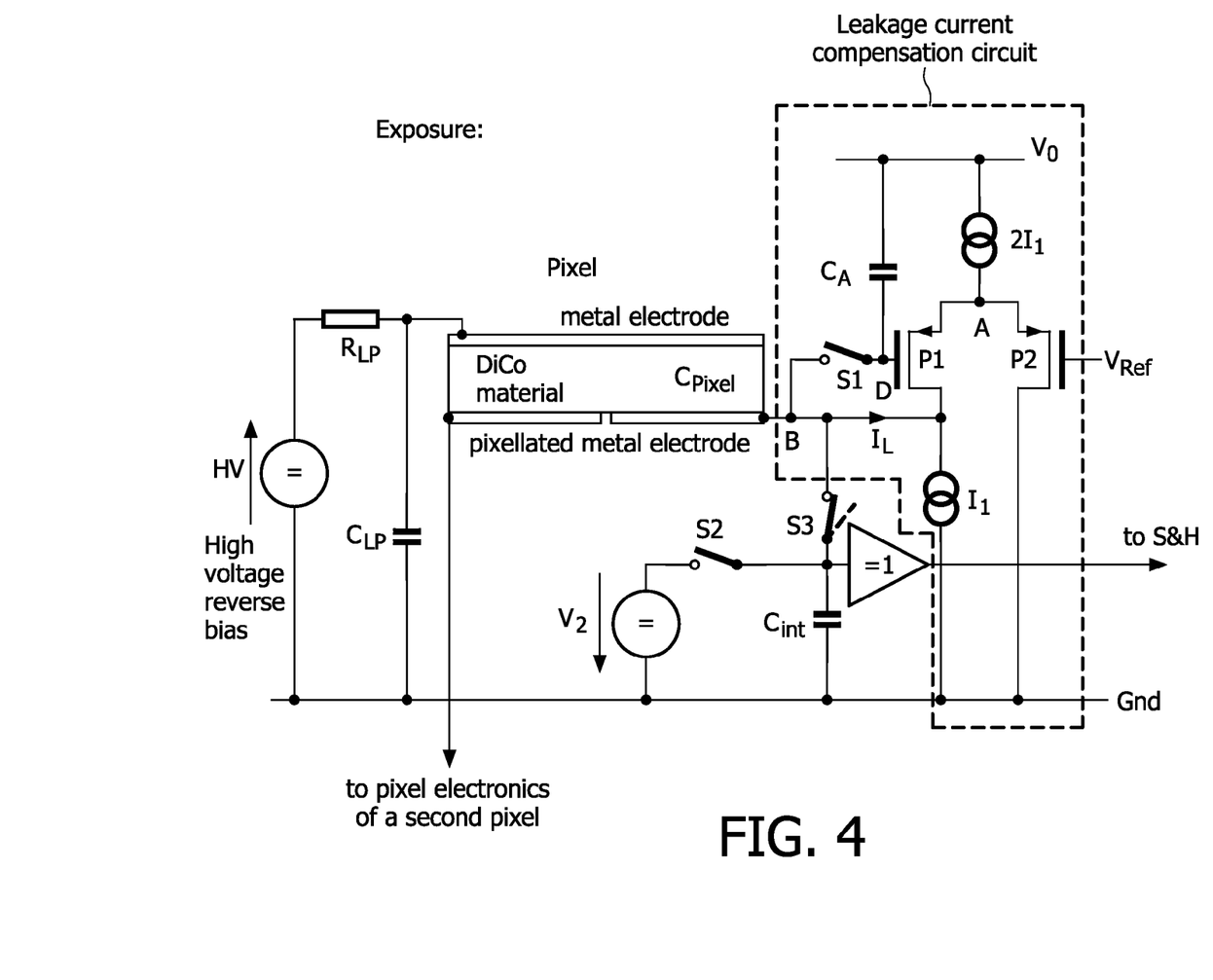
FIG. 4 shows a circuit of an exemplary embodiment of the present invention ready for exposure.

The detailed function and operation of the method and the corresponding circuit will be described with reference to FIGS. 2 to 4.

Figure 2:
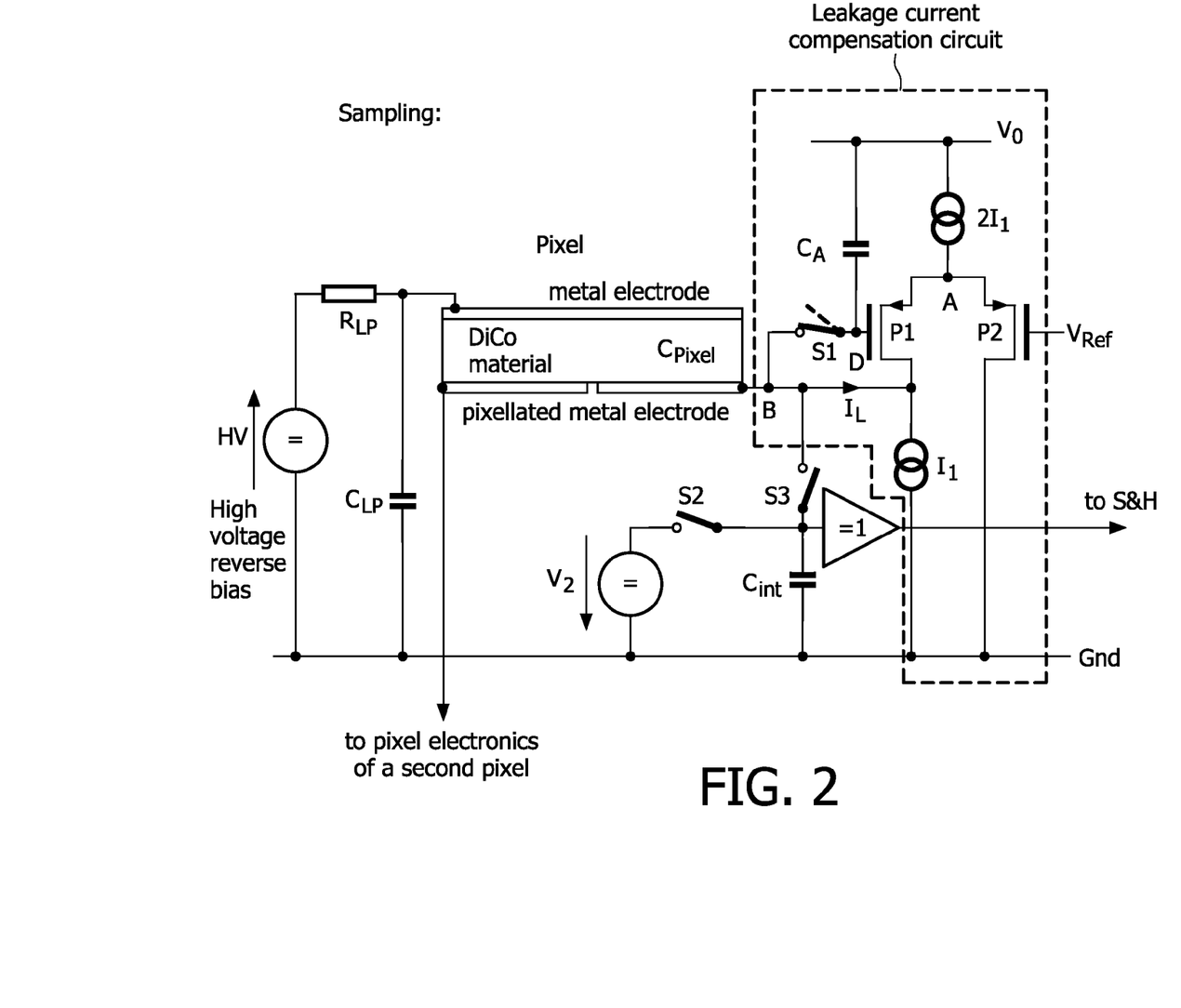
FIG. 2 shows a sensing phase of a circuit of an exemplary embodiment of the present invention to determine the dark current.

FIG. 2 shows a sensing phase of a circuit of an exemplary embodiment of the present invention to determine the dark current.

If the sensor is disconnected, S1 is closed and S2 and S3 are open in FIG. 2, the current source "$I_1$" causes the p-MOSFET P1 to drain exactly $I_1$. The p-MOSFET P2 also drains "$I_1$", since it is manufactured with (exactly) the same dimensions as P2. In other words, the current of the current source "$2I_1$" is distributed equally to P1 and P2. Since P2's gate voltage is preset to $V_{Ref}$, P1 must have, in this equilibrium, the same gate voltage, i.e. $V_B=V_{Ref}$. In case of a geometry mismatch between P1 and P2, P1 and P2 will usually not drain the same current ($I_1$), but these currents still add up to $2I_1$.

In a first step, a sensing phase, the sensor is connected to the circuit and its dark current is sensed, so that the dark current compensation circuit is configured such that it drains the sensor's dark current.

The sensor is connected to node B in FIG. 2 with switch S1 still being closed, while switches S2 and S3 are open. Any (constant) dark current can only flow as indicated by "$I_L$", where both polarities of $I_L$ are possible, since the gate of P1 and $C_A$ represent an infinite resistance for a constant current. Shortly after connecting the sensor, charges provided by the dark current charge the lower plate of the capacitance $C_A$. An equilibrium is reached, if the sum of the drain current of the p-MOSFET P1 and $I_L$ equals the current $I_1$ imposed by the current source "$I_1$". In case of $I_L>0$, this requires a drain current of P1, which equals $I_1-I_L$, while P2 drains $I_1+I_L$. In case of $I_L<0$, P1 has to drain $I_1+I_L$, and then P2 drains $I_1-I_L$. Hence, in both cases, $I_1$ necessarily has to exceed $I_L$ so that the circuit is able to compensate for the dark current $I_L$.

In this equilibrium, the potential $V_A$ of point A assumes a value such that P2's gate-source voltage $V_{GS,P2}=V_{Ref}-V_A$ fits the value of P2's drain current. Similarly, the voltage across $C_A$ (which equals $V_0-V_B$) assumes a value, for which the gate-source voltage of P1 corresponds to the required drain current through P1, $V_{GS,P1}=V_B-V_A$. It is important that $V_A$ does not increase in a way that the current source "$2I_1$" exceeds the saturation region. For $I_L>0$, $V_B$ has to become bigger than $V_{Ref}$, since P1 only drains $I_1-I_L$, which needs a smaller gate-source voltage of P1 than in the equilibrium situation where $V_B=V_{Ref}$ (without the dark current being injected). Likewise, for $I_L<0$, $V_B$ has to become smaller than $V_{Ref}$ since P1 drains $I_1+I_L$.

If after this, S1 is opened again, $C_A$ freezes "the state" of P1 so that $I_L$ can continue to be drained in the left branch of the FET-pair (P1, P2).

The voltage source HV represents the high voltage, which is needed to keep the DiCo sensor material in reverse bias. As known from prior art, the RC-stage established by $R_{TP}$ and $C_{TP}$ is used to filter out ripples on the high voltage.

In a second step the integration capacitance $C_{int}$ is prepared for being connected to the dark current compensation circuit.

Switch S2 is closed (FIG. 3) (S1, S3 being open) to charge the integration capacitance to a voltage $V_2$, the magnitude of which is determined by the potential, which node B is allowed to assume, when switch S3 is closed (cf. 3. step) so that $C_{int}$ is connected in parallel to the current source "$I_1$": The limiting conditions for $V_B$, when switch S3 is closed, are:

a) $V_B$ must not become so small that the current source "I1" is no longer in saturation.

b) $V_B$ must not become so big that the drain-source voltage of P1 becomes smaller than its gate-source voltage, which P1 takes on in order to drain $I_1-I_L$ (in case of $I_L>0$) or $I_1+|I_L|$ (in case of $I_L<0$). Otherwise, P1 would exceed the saturation region, and also $V_A$ may change, so that P1 and P2 may not work as intended.

c) For a sensor current, which is based on holes (this would be the case for some Se-detectors with appropriate doping and appropriate electrode material), $V_B$ must leave enough headroom for $C_{int}$ to be charged by positive charges generated by X-ray interaction with the DiCo material so that b) is not violated.

A good choice for $V_2$ is $V_{Ref}-V_{GS,P1}(I_{D,P1}=I_1+|I_L|)$ [wherein $V_{GS,P1}(I_{D,P1}=I_1+|I_L|)$ is to express the gate-source voltage of P1, which is needed to make sure that P1 actually drains $I_1+|I_L|$] for $I_L<0$ (for PbO, HgI$_2$), since $V_D$ is smaller than $V_{Ref}$: $V_D=V_A-|V_{GS,P1}(I_{D,P1}=I_1+|I_L|)|$, $V_A=V_{Ref}+|V_{GS,P2}(I_{D,P2}=I_1-|I_L|)|$, and the signal current generated by X-ray interaction with the DiCo material is also negative so that $C_{int}$ is discharged due to the integrated signal current, and hence the voltage across $C_{int}$ during exposure does not increase $V_2$. The maximum charge that can be integrated during a single exposure without reset without compromising the operation of the dark current compensation circuit is $Q_{max}=C_{int}(V_2-V_{B,min})$, where $V_{B,min}$ is the minimum voltage of node B such that the current source "$I_1$" is still in saturation mode.

For $I_L>0$ (for some types of Se-detectors), $V_2$ must not be chosen bigger than $V_A-V_{GS,P1}(I_{D,P1}=I_1-I_L)-Q_{max}/C_{int}$, where $Q_{max}$ is the maximum charge, which is integrated on $C_{int}$ during exposure, and $V_2$ also must not fall below $V_{B,min}$. Note that for $I_L>0$, $V_D$ is already bigger than $V_{Ref}$, because $V_A$ has to increase compared to equilibrium, since P2 drains $I_1+I_L$, and $V_{GS,P1}$ becomes smaller than in equilibrium, since P1 only drains $I_1-I_L$; $V_D=V_A-|V_{GS,P1}(I_{D,P1}=I_1-|I_L|)|$, $V_A=V_{Ref}+|V_{GS,P2}(I_{D,P2}=I_1+|I_L|)|$.

The above conditions may change, if there is a mismatch between P1 and P2, e.g. a geometry mismatch.

In a third step an operation takes place with the connected sensor. Switch S2 is opened, and S3 is closed (FIG. 4). Now the integration capacitance is connected to the sensor pixel. Since $C_{int}$ was set to a voltage, which fulfils a), b) [and c) for $I_L>0$], the draining of the dark current continues as before.

If now the sensor pixel generates charges due to X-ray exposure, they flow onto the integration capacitance $C_{int}$, where they are accumulated. Due to the charges the voltage across $C_{int}$ changes. The voltage change should be small enough such that the current source "$I_1$" or P1 does not exceed the saturation region.

Via the "(=1)-amplifier" (e.g. a source follower) the integration capacitance's voltage can be copied "non-destructively" to a sample and hold (S&H) stage, from where the voltage can be read-out. The voltage change $\Delta U$ compared to the voltage achieved by the reset is a measure for the charge $Q=C_{int} \Delta U$ provided by the direct conversion (DiCo)-sensor pixel.

For later exposures, $C_{int}$ can be reset to $V_2$ by closing S2 without a further phase for sensing the sensor's dark current again. For such resets switch S3 can be kept close, since $V_B$ only "moves" along the allowed drain-source voltages, which keep "$I_1$" in saturation.

The size of $C_{int}$ determines the most sensitive operation mode of the detection circuit, since the voltage change across $C_{int}$ due to a (smallest detectable) charge pulse $\Delta Q$ coming from the DiCo material causes a voltage change of $\Delta U=\Delta Q/C_{int}$, which has to be related to $V_2$ and to the smallest difference in the input voltage, which the ADC behind the S&H stage can distinguish. By connecting further gain capacitances in parallel to $C_{int}$, the sensitivity can be reduced, since then $\Delta Q$ causes a smaller change in the voltage across $C_{int}+C_{gain}$: $\Delta U'=\Delta Q/(C_{int}+C_{gain})$.

A similar circuit can be defined, which circuit only bases on n-MOSFETs rather than p-MOSFETs. Then, however, one terminal of $C_{int}$ is connected to $V_0$ rather than to Gnd, which may be disadvantageous w.r.t. the design of the S&H-stage.

Figure 5:
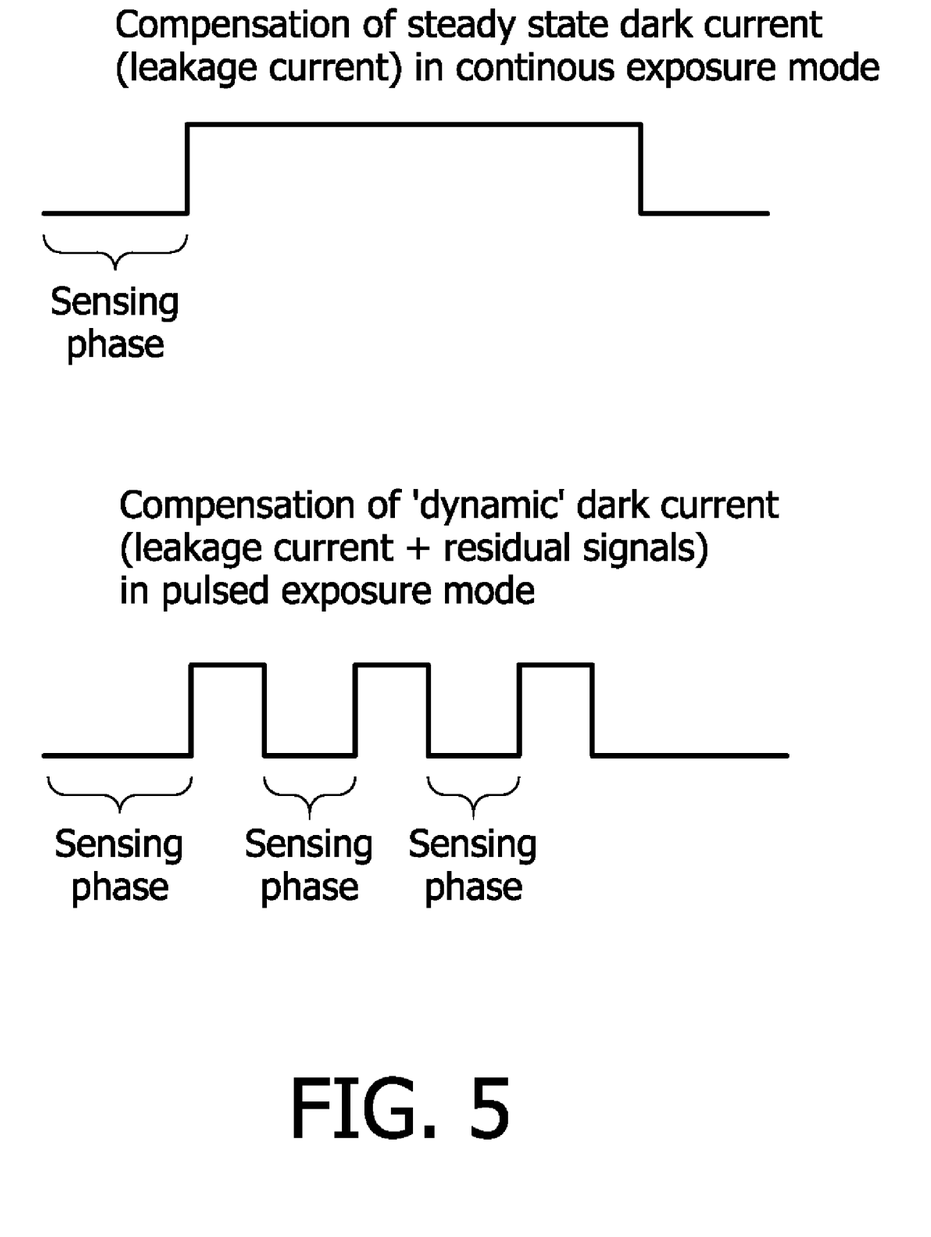
FIG. 5 shows two different application scenarios for dark current compensation according to an exemplary embodiment of the present invention.

FIG. 5 shows two exemplary modes of compensation, one for a single sensing phase, a second for a multiple sensing phase.

As described above, the dark current compensation consists of two main steps, a sensing phase with no X-ray exposure and an X-ray operation phase. Different application scenarios are possible as shown in FIG. 5. For compensation of the steady state leakage current, only a single sensing phase is necessary before the X-ray exposure starts. All subsequent exposed frames are compensated for the same dark current.

For a 'dynamic' dark current compensation, which captures also the residual signals, the sensing phases have to be interleaved with the X-ray windows. At the end of each sensing phase, the present dark current residual signals including is frozen and used to compensate the dark current in the subsequent exposure window. Since the residual signals decay with time, this approach over-estimates the dark current during the subsequent X-ray window and may lead to slight over-compensation. However, the image quality is expected to be significantly improved compared to the standard case with no residual signal correction. In contrast to the compensation of leakage current only, the dark current due to charge detrapping is not constant during the sensing phase. Therefore, the circuit, i.e. mainly the capacitor $C_A$, has to be designed such that the potential of node A can adapt to the residual signal decay with only little delay during the sensing phase.

The invention can be applied to all sorts of X-ray detectors using direct X-ray conversion and pixel electronics using CMOS technique. Dark current compensation (i.e. leakage current and residual signal of previous exposures) allows a more efficient detector operation with a wider range of suitable materials.

The applications can be e.g. in cardio-vascular X-ray, general X-ray, neurology, orthopedics, mammography and dental imaging. Also it may be applied in the field of material science, non destructive testing and other related applications.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims. It may also be applied in the field of material science, non-destructive testing and other related applications.

The invention claimed is:

1. Method for eliminating a sensor's dark current in an examination exposure device, the dark current resulting from a steady state leakage current and/or dynamic residual signals of the sensor from previous exposures, comprising the steps of:
    in a first phase (ST1), applying a predetermined voltage (HV) to the sensor and sensing the dark current ($I_L$) being input into a dark current compensation device;
    in a second phase (ST2), freezing a state within the dark current compensation device which it had when draining the dark current in the first phase, while maintaining the predetermined voltage (HV) at the sensor; and
    charging an integration capacity ($C_{int}$) with a second voltage($V_2$), wherein one terminal of the integration capacity is connected to the input of the dark current compensation circuit and the input of an amplifier, wherein another terminal of the integration capacity is connected to ground (ST3).

2. The method of claim 1, wherein the step of the first phase is applied while keeping the sensor substantially free of X-ray exposure.

3. The method of claim 1, wherein the step of the first phase is applied within an intermediate dark frame without examination exposure or within a reset phase.

4. The method of claim 1, wherein the first phase includes a step of charging a capacitance ($C_A$), the voltage thereof determining a gate-source voltage of a FET, which drains the dark current (ST1a).

5. The method of claim 1, wherein the step of the second phase includes keeping a gate-source voltage of a FET at a level, which it had when the FET drained the dark current in the first phase (ST2a).

6. The method of claim 5, wherein the step of the second phase includes a step of freezing the voltage across a capacitance ($C_A$) keeping a gate-source voltage of a FET at a level it had, when the FET drained the dark current during the first phase.

7. A non-transitory computer readable medium embodied with a computer program of instructions, which, when being executed by a processor, is adapted to carry out the steps of the method of claim 1.

8. A dark current compensation device for compensating a dark current resulting from a steady state leakage current and/or dynamic residual signals of a sensor, the device comprising:
    a first FET (P1), the drain of which is connected to the input of the device and connected to ground via a first current source ($1_1$), the gate of which is connected to the input of the device via a first switch (S1), and the source of which is connected via a second current source ($21_1$) to a terminal which is connectable to a voltage supply ($V_0$);
    a second FET (P2), the drain of which is connected to ground, the gate of which is connectable to a reference voltage ($V_{Ref}$), and the source of which is connected to the source of the first FET (P1);
    a capacitance ($C_A$), one terminal of which is connected to the gate of the first FET (P1) and the other terminal of which is connected to the terminal which is connectable to the voltage supply ($V_0$); and
    an integration capacitance $C_{int}$ having (a) one terminal connected (a)(i) to a second voltage ($V_2$) via a second switch (S2) charging the integration capacitance, wherein the one terminal is further connected (a)(ii) to the input of the dark current compensation device via a third switch (S3) and (a)(iii) to the input of an amplifier, the integration capacitance further having (b) another terminal connected to ground.

9. An exposure device for being used in an examination apparatus, the exposure device comprising:
    a voltage supply;
    a dark current compensation device as set forth in claim 8;
    a sensor device, one terminal of which is connected to the output of the voltage supply, and a further terminal of which is connected to the input of the dark current compensation device.

10. The exposure device of claim 9, wherein the sensor device comprises (i)a direct conversion material layer (DiCo),
    (ii)a metal electrode for applying a predetermined voltage (HV) on one side of the DiCo layer, and
    (iii) a plurality of electrodes, on the other side of the DiCo layer, forming the pixels of the sensor device, wherein at least one of the plurality of electrodes is connectable to pixel-electronics of respective ones of the pixels, the pixel electronics respectively comprising respective dark current compensation devices provided for respective pixels.

11. An exposure device for being used in an examination apparatus, the exposure device comprising:
    a voltage supply;
    a dark current compensation device, the dark current compensation device for compensating a dark current resulting from a steady state leakage current and/or dynamic residual signals of a sensor, the dark current compensation device including(i) a first FET (P1), the drain of which is connected to the input of the device and connected to ground via a first current source ($1_1$), the gate of which is connected to the input of the device via a first switch (S1), and the source of which is connected via a second current source($21_1$) to a terminal which is connectable to a voltage supply ($V_0$), (ii) a second FET (P2), the drain of which is connected to ground, the gate of which is connectable to a reference voltage ($V_{Ref}$), and the source of which is connected to the source of the first FET (P1), and (iii) a capacitance ($C_A$), one terminal of which is connected to the gate of the first FET (P1) and the other terminal of which is connected to the terminal which is connectable to the voltage supply ($V_0$);

a sensor device, one terminal of which is connected to the output of the voltage supply, and a further terminal of which is connected to the input of the dark current compensation device, wherein the sensor device is capable of sensing X-ray radiation; and an integration device, the input of which is connected to the input of the dark current compensation device via a third switch (S3), wherein the voltage supply includes a voltage source (HV) of a predetermined voltage, one terminal of which is connected to ground and the other terminal of which is connected to the output of the voltage supply via a resistor ($R_{LP}$); and a capacitance ($C_{LP}$), one terminal of which is connected to ground and the other terminal of which is connected to the output of the voltage supply;

wherein the integration device includes an amplifier, the input of which is connected to the input of the integration device and the output of which is connectable to a sample and hold stage, an integration capacitance ($C_{int}$) one terminal of which is connected to the input of the amplifier and the other terminal of which is connected to ground; and a second voltage source ($V_2$), one terminal of which is connected to ground and the other terminal thereof is connected to the input of the integration device via the third switch (S3).

* * * * *